(12) United States Patent
Lempriere

(10) Patent No.: US 6,302,040 B2
(45) Date of Patent: Oct. 16, 2001

(54) IN-LINE SUB-SURFACE SEEDING, FERTILIZING AND WATERING DEVICE

(76) Inventor: Noel Douglas Lempriere, Box 1178, Barriere, British Columbia (CA), V0E 1L0

( * ) Notice: Subject to any disclaimer, the term of this patent is extended or adjusted under 35 U.S.C. 154(b) by 0 days.

(21) Appl. No.: 09/740,794

(22) Filed: Dec. 21, 2000

Related U.S. Application Data

(63) Continuation-in-part of application No. 09/419,626, filed on Oct. 18, 1999, now Pat. No. 6,182,587.
(60) Provisional application No. 60/104,731, filed on Oct. 19, 1998.

(51) Int. Cl.[7] .................................................. A01C 5/08
(52) U.S. Cl. .......................... 111/124; 111/188; 111/129; 111/73; 111/80; 111/187
(58) Field of Search .............................. 111/124, 73, 129, 111/186, 187, 188, 92, 80

(56) References Cited

U.S. PATENT DOCUMENTS

| | | |
|---|---|---|
| 4,275,671 | 6/1981 | Baker . |
| 4,388,878 * | 6/1983 | Demzin .................................. 111/86 |
| 4,638,748 * | 1/1987 | Kopecky .................................. 111/7 |
| 4,653,412 * | 3/1987 | Clarke .................................. 111/73 |
| 4,770,112 * | 9/1988 | Neumeyer .............................. 111/73 |
| 5,269,237 | 12/1993 | Baker . |

FOREIGN PATENT DOCUMENTS

| | | |
|---|---|---|
| 1211992 * | 9/1986 | (CA) . |
| 2 045 313 | 2/1971 | (FR) . |

* cited by examiner

Primary Examiner—Christopher J. Novosad
(74) Attorney, Agent, or Firm—Antony C. Edwards

(57) ABSTRACT

A sub-surface seeding, fertilizing and watering device includes an opening blade having first and second sides extending between a leading edge and an aft edge. The opening blade has an upper surface and a lower surface extending between upper and lower edges respectively of the first and second sides of the blade. First and second wings are mounted to the first and second sides respectively in generally oppositely disposed relation so as to be cantilevered outwardly therefrom. The first and second wings extend between first and second forward wing edges and first and second aft-opening wing apertures. Seed, fertilizer or water are dispensed through the wing apertures. Oppositely disposed, rigid canards for subsurface soil agitation are mounted to the first and second sides, so as to extend cantilevered outwardly therefrom. The canards may be mounted between the leading edge of the blade and the first and second forward wing edges.

15 Claims, 16 Drawing Sheets

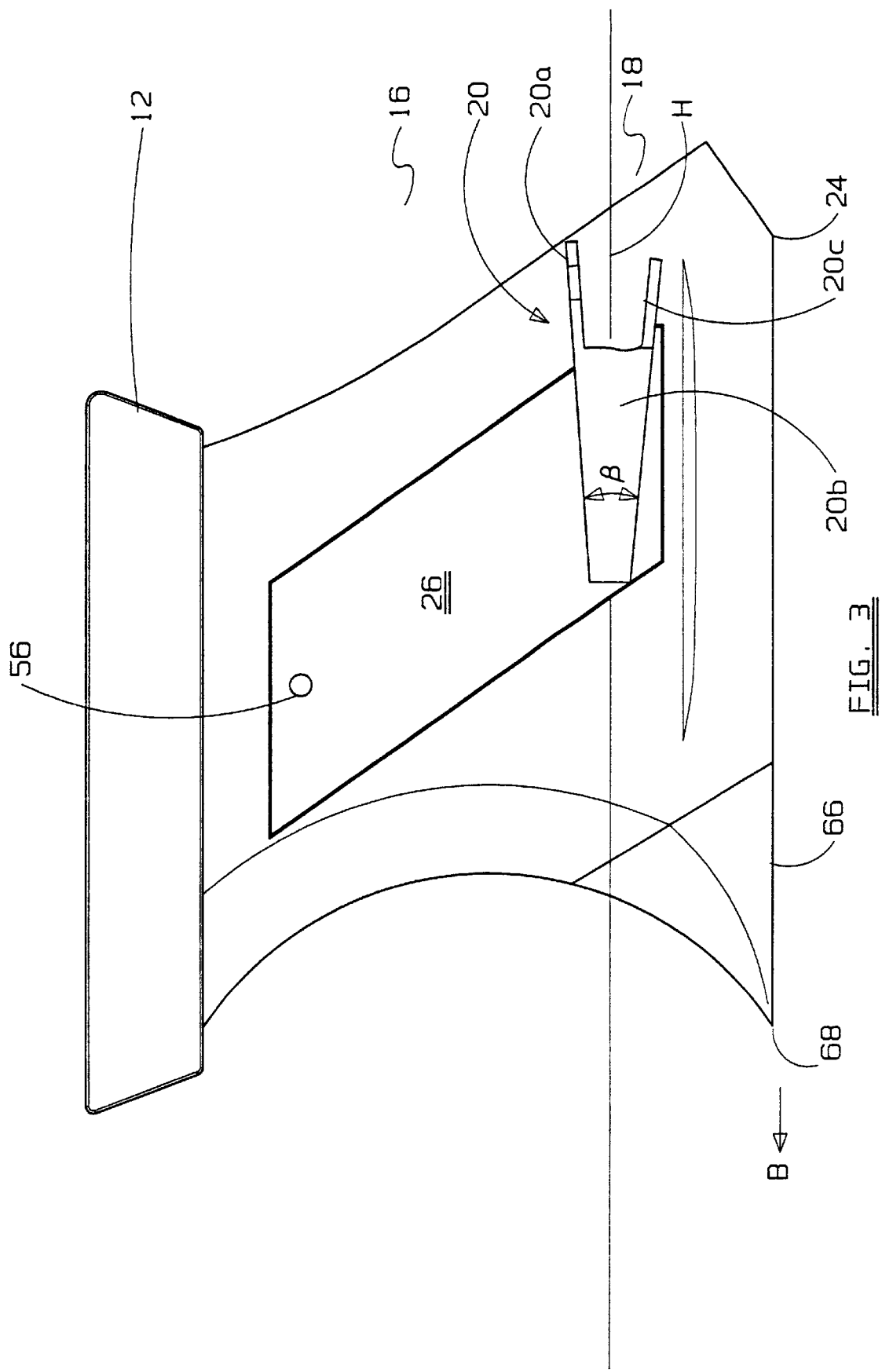

IN-LINE SUB-SURFACE SEEDING, FERTILIZING AND WATERING DEVICE

CROSS REFERENCE TO RELATED APPLICATION

This application is a Continuation-in-Part from U.S. application Ser. No. 09/419,626 filed Oct. 18, 1999, now U.S. Pat. No. 6,182,587, which claims priority from U.S. Provisional Pat. application Ser. No. 60/104,731 filed Oct. 19, 1998.

FIELD OF THE INVENTION

This invention relates to the field of opening blades which may be partially submerged into earth, for example in a farmers field, so as to pass the blade at a submerged depth for delivery of seeds, fertilizer or water into the earth.

BACKGROUND OF THE INVENTION

It is known that the use of plows or other devices having for example tillage discs for tilling the earth or otherwise opening and turning a furrow through the ground suffer from the disadvantage that the moisture in the soil is unnecessarily exposed to evaporation. However, it is necessary to open the earth so that the ground beneath the surface may be seeded, fertilized and watered. In the prior art, whether this was accomplished by machinery or done manually, prior art machines or manual systems also suffered from the disadvantage that fertilizer may have been delivered into close proximity to the seeds being sown occasionally resulting in the seeds becoming chemically burnt.

SUMMARY OF THE INVENTION

In summary, the sub-surface seeding, fertilizing and watering device of the present invention includes an opening blade having first and second sides extending between a leading edge and an aft edge. The first and second sides may be advantageously generally symmetrical to each other on either side of a first plane, where the first plane generally bisects the opening blade. The leading edge and the aft edge may lie generally in the first plane.

The opening blade has an upper surface and a lower surface extending between upper and lower edges respectively of the first and second sides of the blade. First and second wings are mounted to the first and second sides respectively in generally oppositely disposed relation so as to be cantilevered outwardly therefrom. The first and second wings extend between first and second forward wing edges and first and second aft-opening wing apertures in the first and second wings respectively. The first and second wings are mounted to the first and second sides at, respectively, first and second distances from the lower surface measured generally parallel to the first plane.

A pair of oppositely disposed, rigid canards is mounted to the first and second sides, so as to extend cantilevered outwardly therefrom. The canards may be mounted between the leading edge and the first and second forward wing edges. The pair of oppositely disposed rigid canards are mounted to said first and second sides at, respectively, third and fourth distances from said lower surface measured generally parallel to said first plane. The third and fourth distances may be equal distances.

The opening blade has therethrough, and generally lying in the first plane, first and second conduits, extending from, and cooperating with, at uppermost ends thereof, first and second infeed ports in the upper surface. The first and second conduits cooperate with, at lowermost ends thereof, the first and second aft opening wing apertures. The first and second conduits are thereby in material flow communication between the first and second infeed ports and the corresponding first and second aft opening wing apertures for seed, fertilizer or fluid flow, as fed from a material feeder, therethrough during the forward translation of the blade.

The opening blade is mountable to the material feeder so as to be generally vertically disposed, when mounted thereon, for partial submerging into soil to a first submerged depth advancing the leading edge through the soil. The first, second, third and fourth distances are less than the first submerged depth so that the first and second wings and the pair of canards are submerged in the soil during the forward translation of the blade.

In one embodiment, the opening blade may further include a third conduit extending in material flow communication between a third infeed port in the upper surface and an aft opening blade aperture in a rearward position on the opening blade in proximity to the aft edge for seed, fertilizer or fluid flow therethrough, as fed from the material feeder. The aft-opening blade aperture may be centrally disposed relative to the first plane so as to lie generally symmetrically across the first plane, and may be positioned so that the aperture intersects the lower surface of the blade. Thus the aft-opening blade aperture may be formed generally at the intersection of the lower surface and the aft edge of the blade. The aft-opening blade aperture may lie in a second plane at generally 30° inclined relative to a third plane generally containing the lower surface of the blade, wherein the third plane is generally orthogonal to the first plane.

The first, second and third conduits may be generally parallel and, at least in part, raked aft of their corresponding first, second and third infeed ports. The first, second and third conduits may be, at least in part, raked aft at an angle of approximately 55° relative to a fourth plane generally containing the upper surface of the blade if the upper surface is a planar generally horizontal surface, although this is not necessarily so.

In a further aspect of the invention, the leading edge is concavely curved and forms a toe, which may be pointed, at the intersection of the leading edge and the lower surface of the blade. The pointed toe may be made of hardened material relative to the hardness of material forming the balance of the opening blade.

The first and second wings and the canards may be wedge-shaped and the forward wing and canard edges may be vertices of the wedge-shapes.

The first wing may be defined as being set back a first longitudinal distance from the leading edge and the second wing as being set back a second longitudinal distance from the leading edge. Thus, in another aspect of this invention, the first longitudinal distance may be greater than the second longitudinal distance.

In yet a further aspect of the present invention, in the wing design, upper wing surfaces on the first and second wings may extend aft over the corresponding first and second aft-opening wing apertures for example on aft cantilevered upper wing members. The lower wing surface on the first and second wings may form a first wedge angle of approximately 5° with the upper wing surface. Further, laterally outer-most wing surfaces extend between the upper and lower wing surfaces. The laterally outer-most wing surfaces may advantageously intersect the corresponding first and second sides of the blade at their corresponding first and second forward wing edges. Thus the laterally outer-most wing surfaces may form a second wedge angle relative to the first and second sides of the blade respectively.

BRIEF DESCRIPTION OF THE DRAWINGS

FIG. 3 is, in left side elevation view, the device of FIG. 1.

DETAILED DESCRIPTION OF EMBODIMENTS OF THE INVENTION

Without intending to be limiting, at least two embodiments of the present invention are described in what follows. The invention is intended to apply to the group of blade openers generally.

Figure 1:
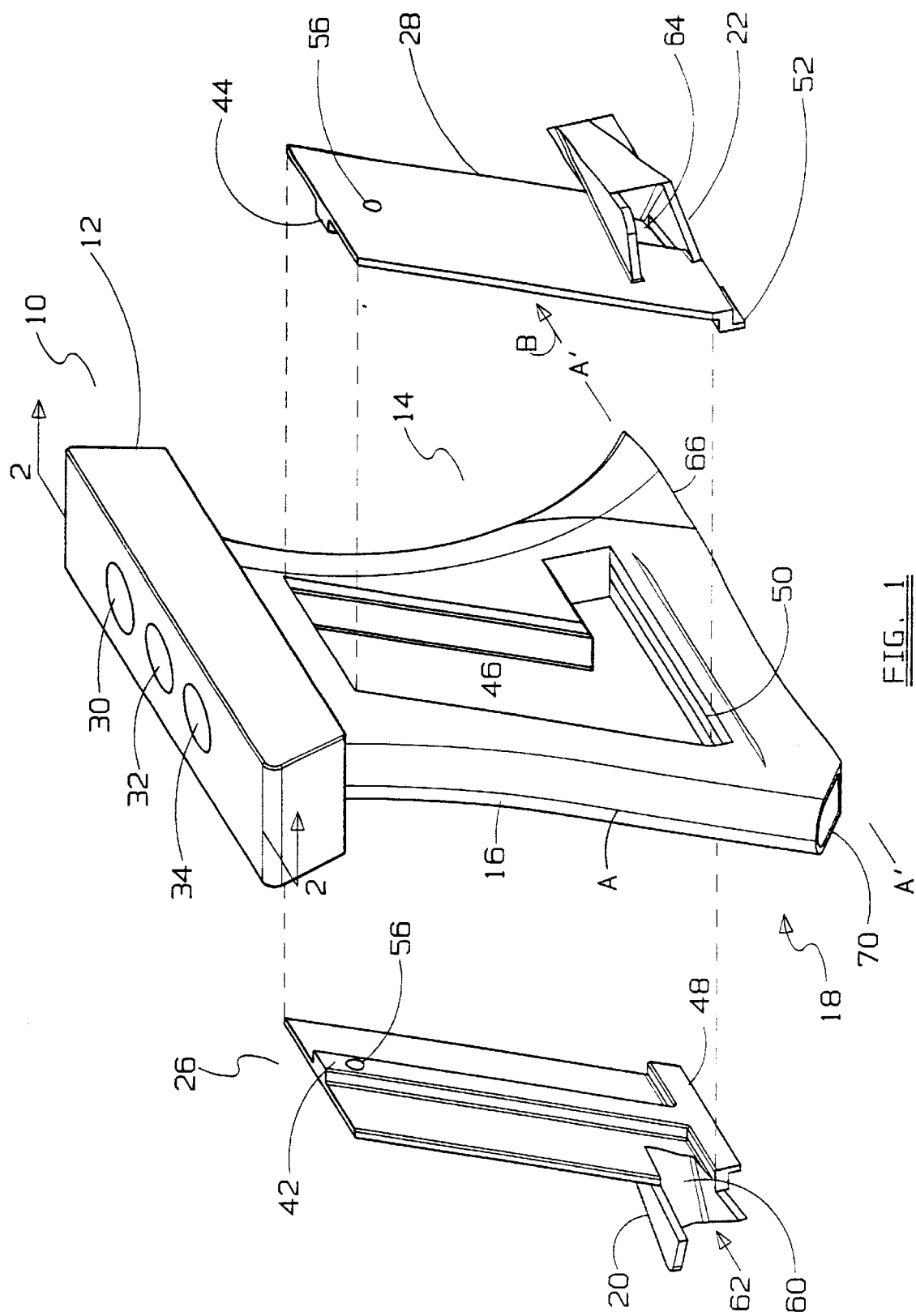
FIG. 1 is, in exploded perspective view, the inline, sub-surface seeding, fertilizing and watering device of the present invention.

As may be seen in FIG. 1, the no-tillage in-line sub-surface seeding, fertilizing and watering device of the present invention is depicted in one embodiment as opening blade 10. Opening blade 10 has an upper, ported, mounting block 12 rigidly mounted atop a generally planar blade structure 14. Blade structure 14 has a trunk 16 depending generally vertically beneath the upper ported mounting block 12. Formed as part of the lower end of trunk 16 is a foot structure generally indicated by numeral 18.

As also seen in FIGS. 2–5, mounting block 12 and blade 14, including trunk 16 and foot 18, are elongate in a generally vertical first plane A. The first plane includes longitudinal axis A'. With the exception of wings 20 and 22, as better described below, the outer surface of trunk 16 smoothly merges into, so as to truncate in cross-section as, a waited or luge shaped foot lower surface 24. In one embodiment access panels 26 and 28, which conformally mount onto the lateral side walls of trunk 16, are symmetrically shaped relative to the plane of symmetry of trunk 16. The plane of symmetry of trunk 16 coincides with the first plane.

Upper ported mounting block 12 has ports 30, 32 and 34 formed in its upper surface. The ports extend downwardly through block 12 in cooperative alignment with corresponding channels 36, 38 and 40 extending downwardly in generally parallel spaced apart array through trunk 16. Channel 40 also extends downwardly through foot 18.

Channels 36 and 38 may, in one preferred embodiment not intended to be limiting, be formed by the alignment and snug adjacency of flanges 42 and 44 on the inner sides of access panels 26 and 28 respectively when the access panels are mounted conformally in opposed relation, to the lateral sides of trunk 16 so as to cover cavity 46 in trunk 16. Access panel 26 may be mounted onto the port side of trunk 16 by means of tab 48 slidably engaging corresponding slot 50 formed in the lower surface defining cavity 46, so as to protrude downwardly into foot 18. In a similar fashion, tab 52 on access panel 28 also slidably engages slot 50 when mounting access panel 28 onto the starboard side of trunk 16. The upper ends of access panels 26 and 28 may be secured by releasable fasteners, for example a cooperating, flush-mounted nut and bolt pair (not shown) journalled through apertures 56.

With access panels 26 and 28 mounted onto trunk 16, so as to cooperatively align and abut flanges 42 and 44, thereby completing forming and separation of channels 36 and 38, channels 36 and 38 form a pair of chutes in cooperative alignment between ports 30 and 32 in mounting block 12 and corresponding lower outlet ports 58 and 60. Lower outlet ports 58 and 60 are directed laterally oppositely and open into the respective interior ducts 62 and 64 formed within respective wings 20 and 22. Interior ducts 62 and 64 open out into corresponding aft-facing apertures from under their respective wings 20 and 22 as better hereinafter described.

Toe 66, which may be of a different and hardened material relative to the material forming mounting block 12, trunk 16 and foot 18, is rigidly mounted, by bolting or other means known in the art, to the forward portion of foot 18 so as to form a forwardly extending point or snout 68, forwardly facing in the direction of forward translation B when the blade is translated in use. Advantageously, mounting block 12, trunk 16 and foot 18 may be made of austempered ductile iron (hereinafter ADI) and toe 66 may be made of a chrome alloy. Access panels 26 and 28 and wings 20 and 22 may also be made of ADI.

Channel 40 is formed within and along the rear or aft edge of trunk 16 and foot 18 so as to form a continuous generally linear conduit between port 34 and rear aperture 70. Advantageously, the rear-most end of foot lower surface 24 is upturned for example as to provide aperture 70 with an opening generally perpendicular to the longitudinal axis of channel 40. Channels 36, 38 and 40 may be generally parallel so as to be raked aft in a downward direction from ports 30, 32 and 34.

Wings 20 and 22 are each shaped as truncated wedges or otherwise as what may be described as irregular pyramid shapes wherein the vertex of each wedge or pyramid is aligned so as to be forward facing (in direction B) with the wedge diverging aft so as to form correspondingly shaped interior ducts 62 and 64 opening aft through the base of the wedges. In one preferred embodiment, the acute angles alpha ($\alpha$) and beta ($\beta$), formed at the vertex of the wedges forming wings 20 and 22, are each approximately 5 degrees.

Figure 3A:
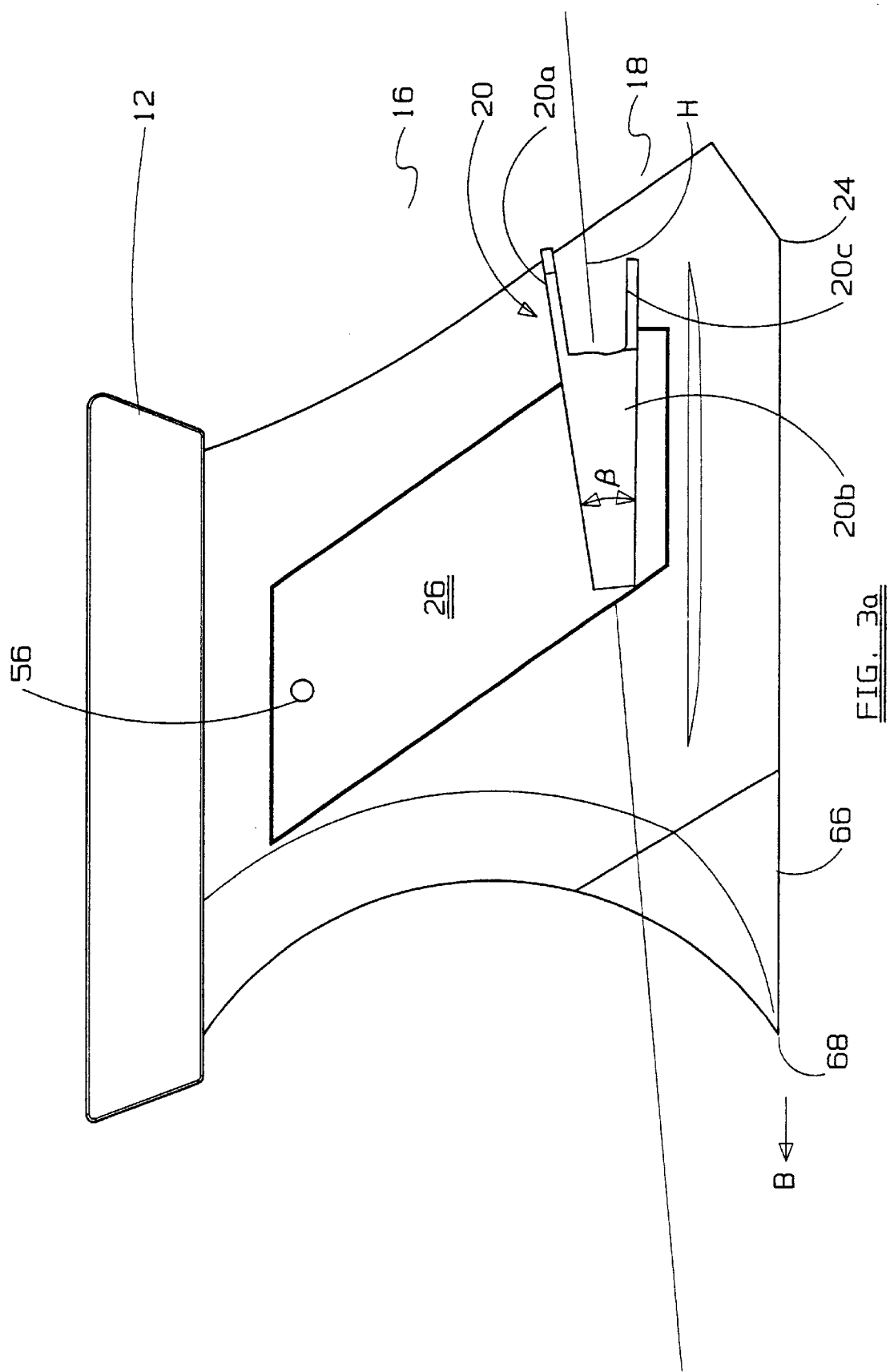
FIG. 3a is, in left side elevation view, an alternative embodiment of the device of FIG. 3.
Figure 4:
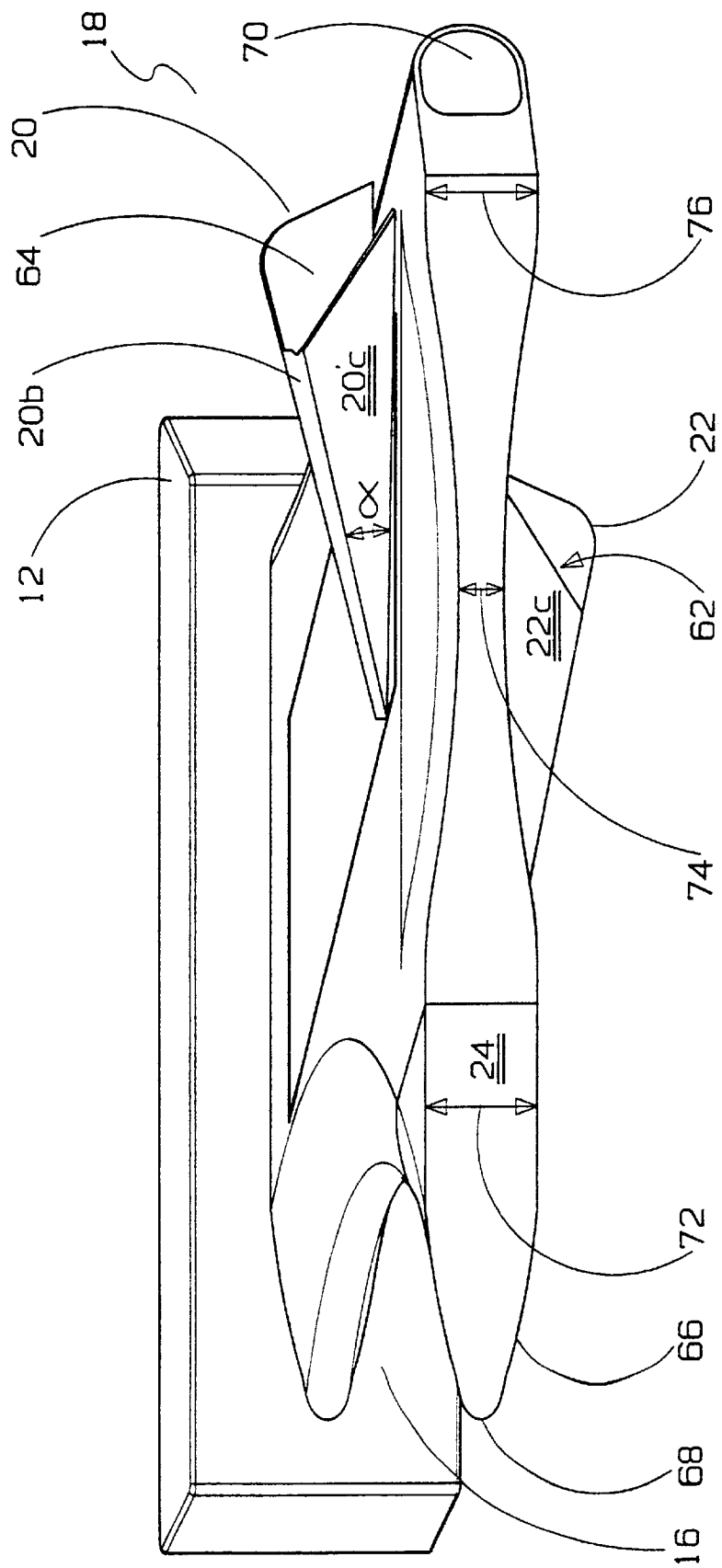
FIG. 4 is, in bottom perspective view, the device of FIG. 1.
Figure 5:
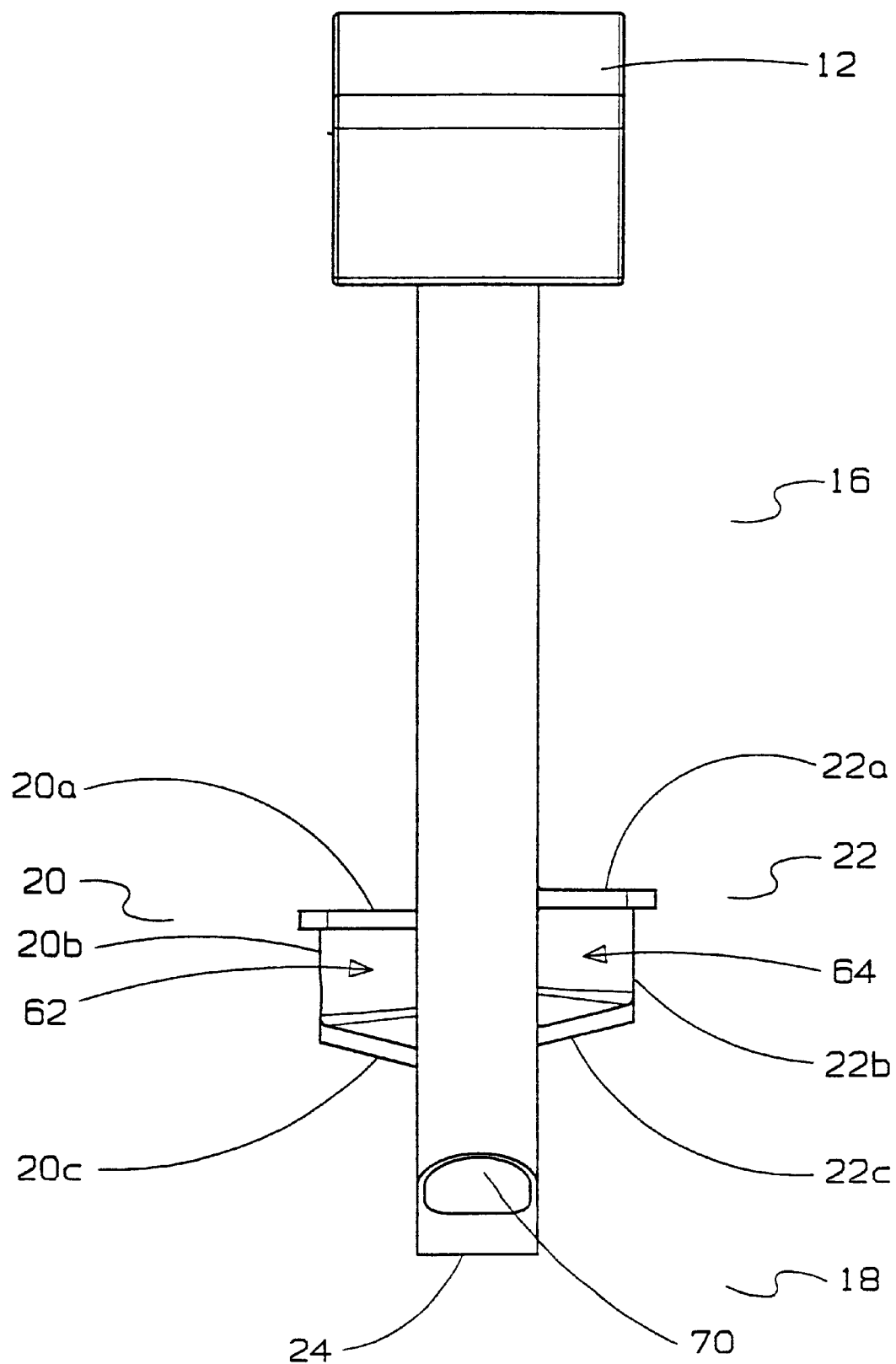
FIG. 5 is, in rear elevation view, the device of FIG. 1.

In the preferred embodiment upper surfaces 20a and 22a, lateral surfaces 20b and 22b, and lower surfaces 20c and 22c of wings 20 and 22 respectively are each generally planar. In one embodiment such as seen in FIG. 3a, the upper surfaces 20a and 22a are inclined forwardly further downwardly relative to the plane containing foot lower surface 24. Thus, a plane H bisecting angle β would in this embodiment advantageously form an angle of approximately 5° relative to the plane F containing foot lower surface 24.

Upper surfaces 20a and 22a extend aft and are cantilevered outwardly over the aft apertures of interior ducts 62 and 64. The aft apertures of interior ducts 62 and 64 are advantageously formed by reducing the longitudinal length of lateral side walls 20b and 22b and raking the rearmost edge of lower surfaces 20c and 22c so as to extend them contiguously aft from the rear edge of lateral side walls 20b and 22b respectively to blend with foot 18.

In one embodiment, foot 18 is curvaceously waisted along its longitudinal length so as to form between curved side walls a forward expanded lateral dimension 72 smoothly tapering into a reduced lateral dimension 74 corresponding to the waisting and, progressing aft, a gentle flaring to an aft expanded lateral dimension 76. In the preferred embodiment the waist of foot 18 approximately corresponds, in the longitudinal direction of axis A', to the position of the forward ends of wings 20 and 22.

Figure 6:
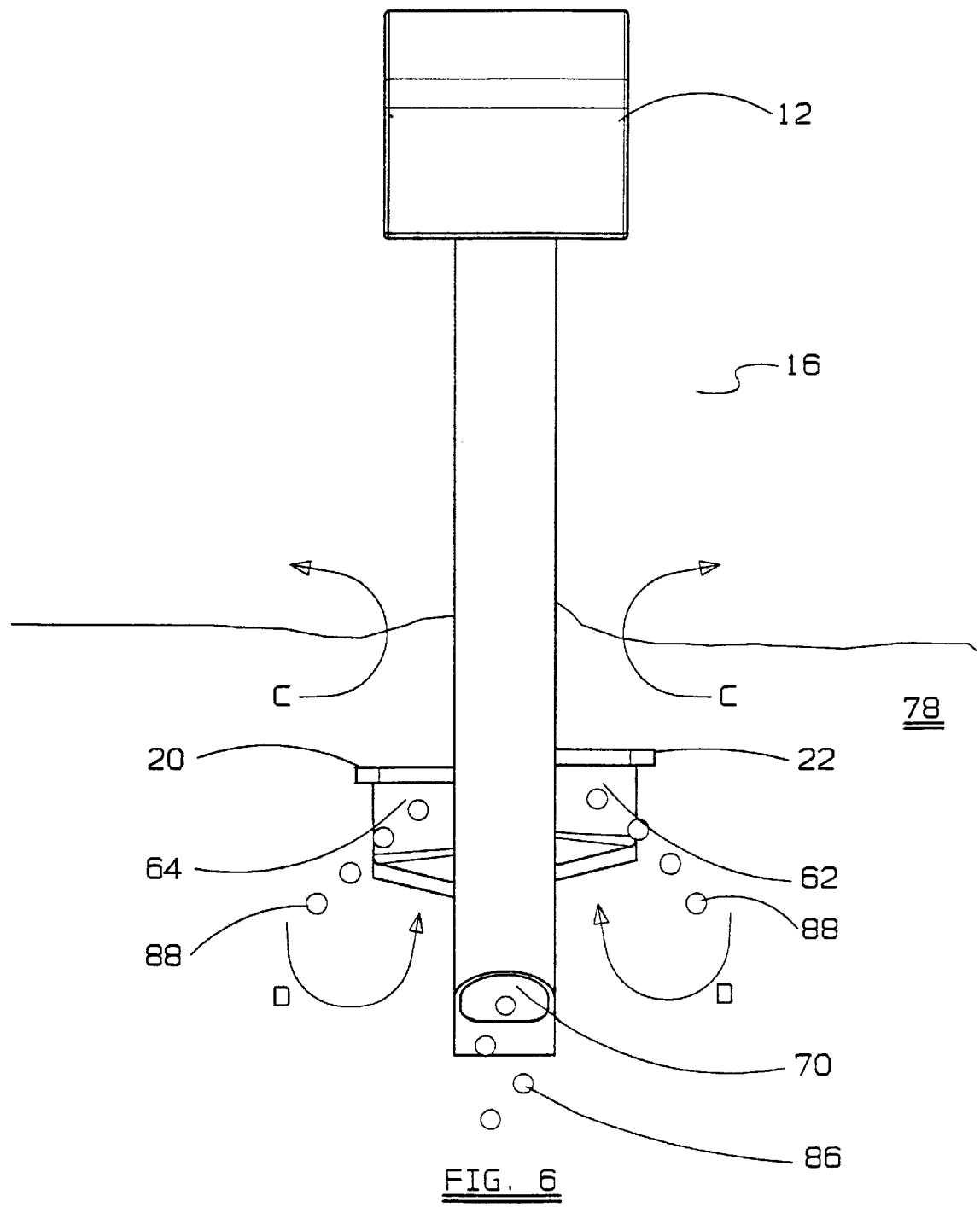
FIG. 6 is the view of FIG. 5 as the blade is passed through soil.

In use, blade 16 is translated in direction B through soil 78. As seen in FIG. 6, blade 16 is driven forwardly and positioned so as to maintain wings 20 and 22 submerged at a shallow depth below the surface of soil 78. Such motion opens the soil upwardly from point 68 on toe 66, upwardly along the leading edge of foot 18 and blade 16 causing a small lifting and separating of soil 78 in opposite directions C. As blade 16 translates through the soil, material fed into ports 30, 32 and 34 flows under the force of gravity through respective channels 36, 38 and 40. Material flowing through channel 40 exits through aperture 70 at the lowermost position of the narrow furrow 80 seen in FIG. 7 formed in soil 78 by the passing of blade 14 therethrough. The passing of wings 20 and 22 through soil 78 form seed shelves 82 in the soil as the soil is displaced by the wings so as to form shoulders 84 approximated in the illustration of FIG. 7.

The forward movement in direction B of blade 14 through soil 78 draws material such as fertilizer 86 from aperture 70, and also draws material such as seeds 88 from ducts 62 and 64 as the seeds are fed from channels 36 and 38 through outlet ports 58 and 60 respectively.

Figure 7:
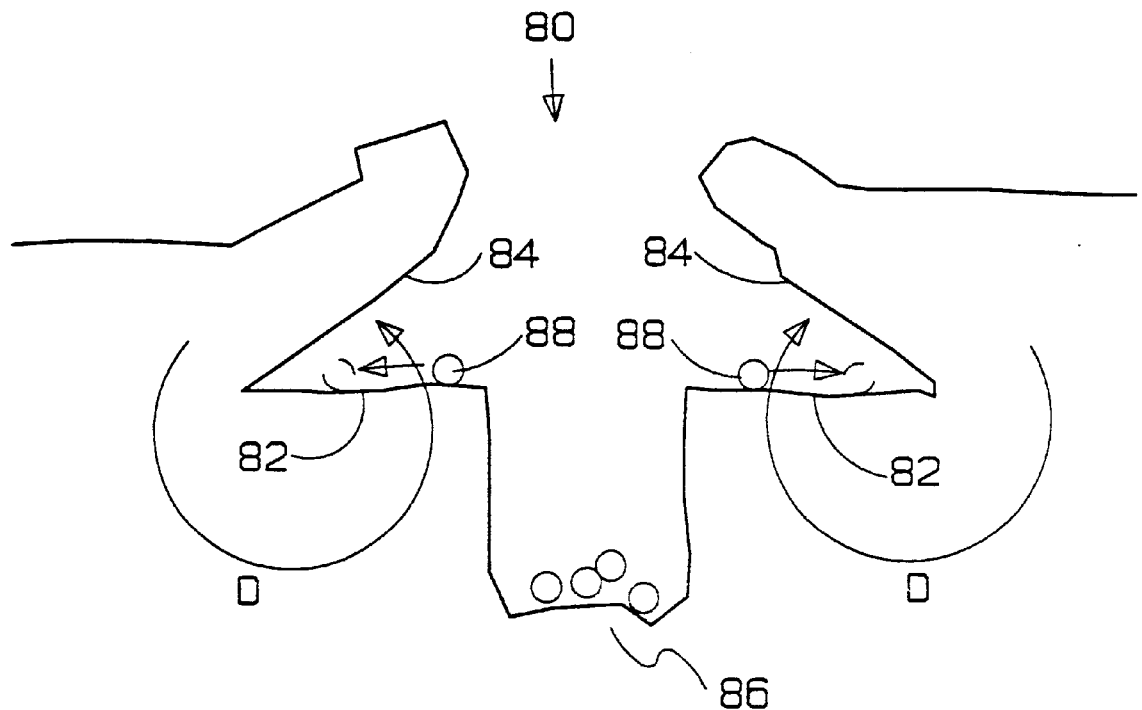
FIG. 7 is the rear elevation view of FIG. 6 with the device of the present invention removed for clarity so as to illustrate an approximation of the soil mechanics during an initial seed placing and fertilizing phase.
Figure 8:
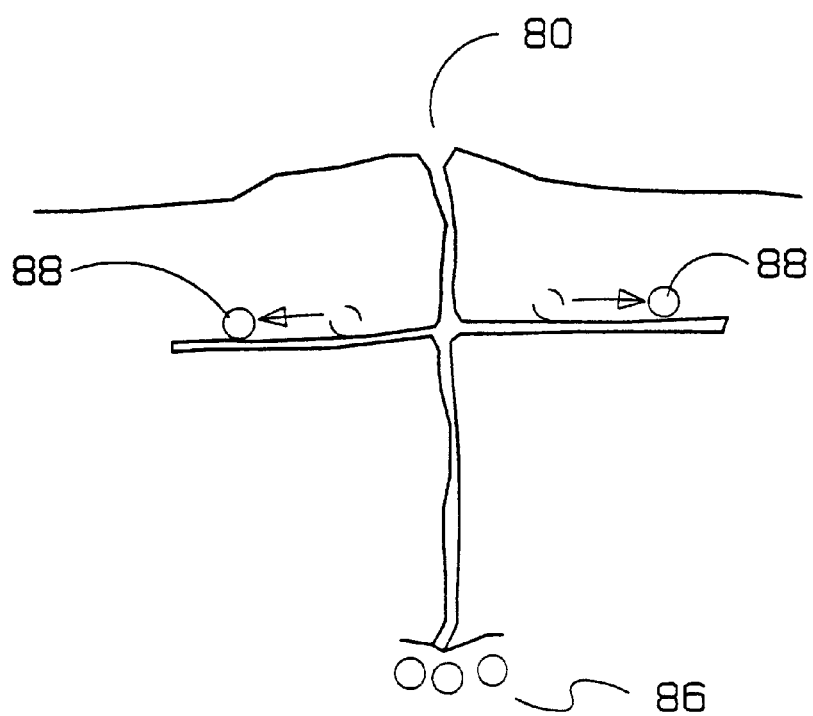
FIG. 8 follows on as a time-elapsed view of the view of FIG. 7, illustrating the collapse of the soil and lateral translation of the seeds following the initial phase.
Figure 9:
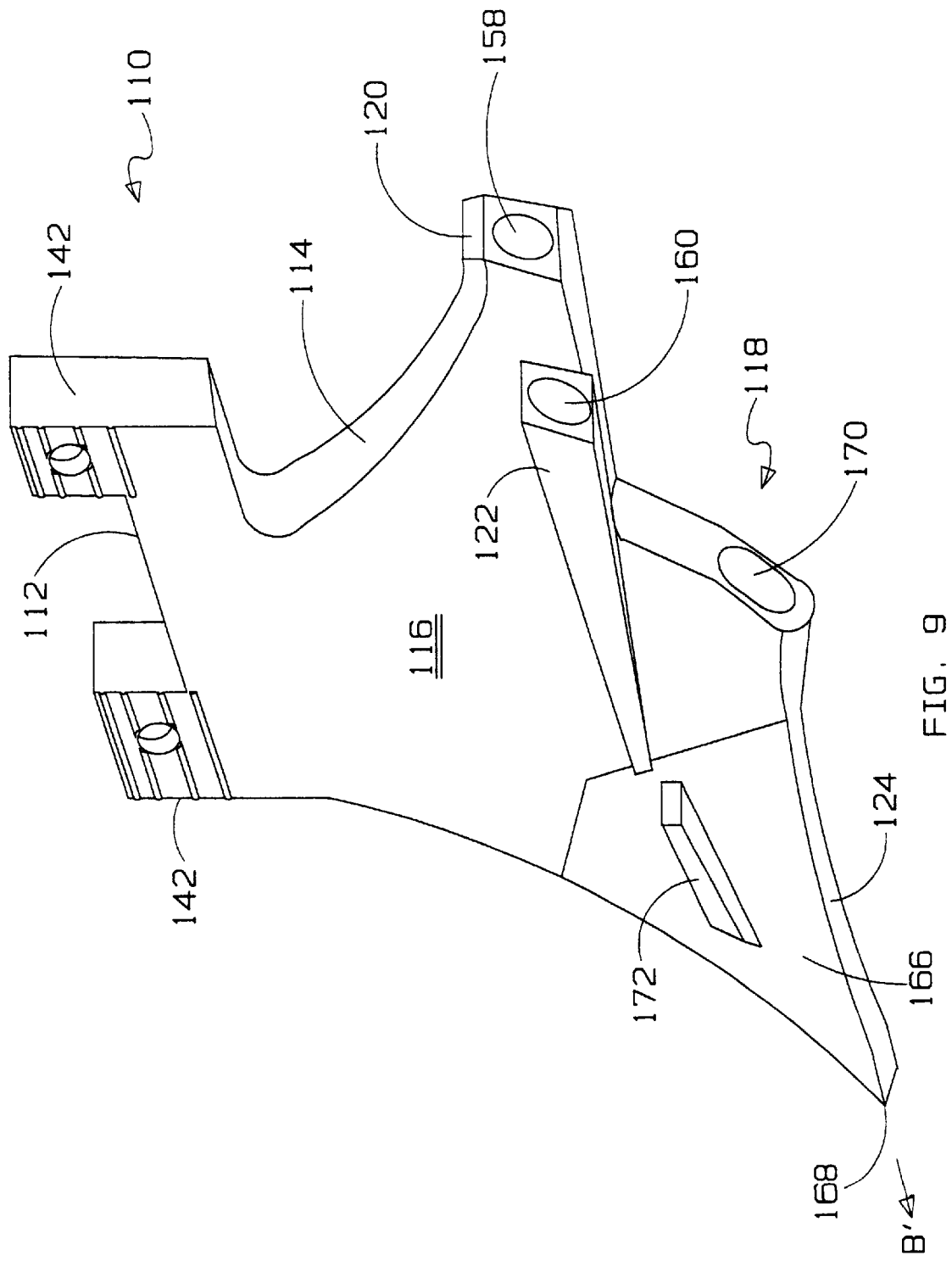
FIG. 9 is, in rear perspective view, an alternative embodiment of the opening blade of the present invention.
Figure 10:
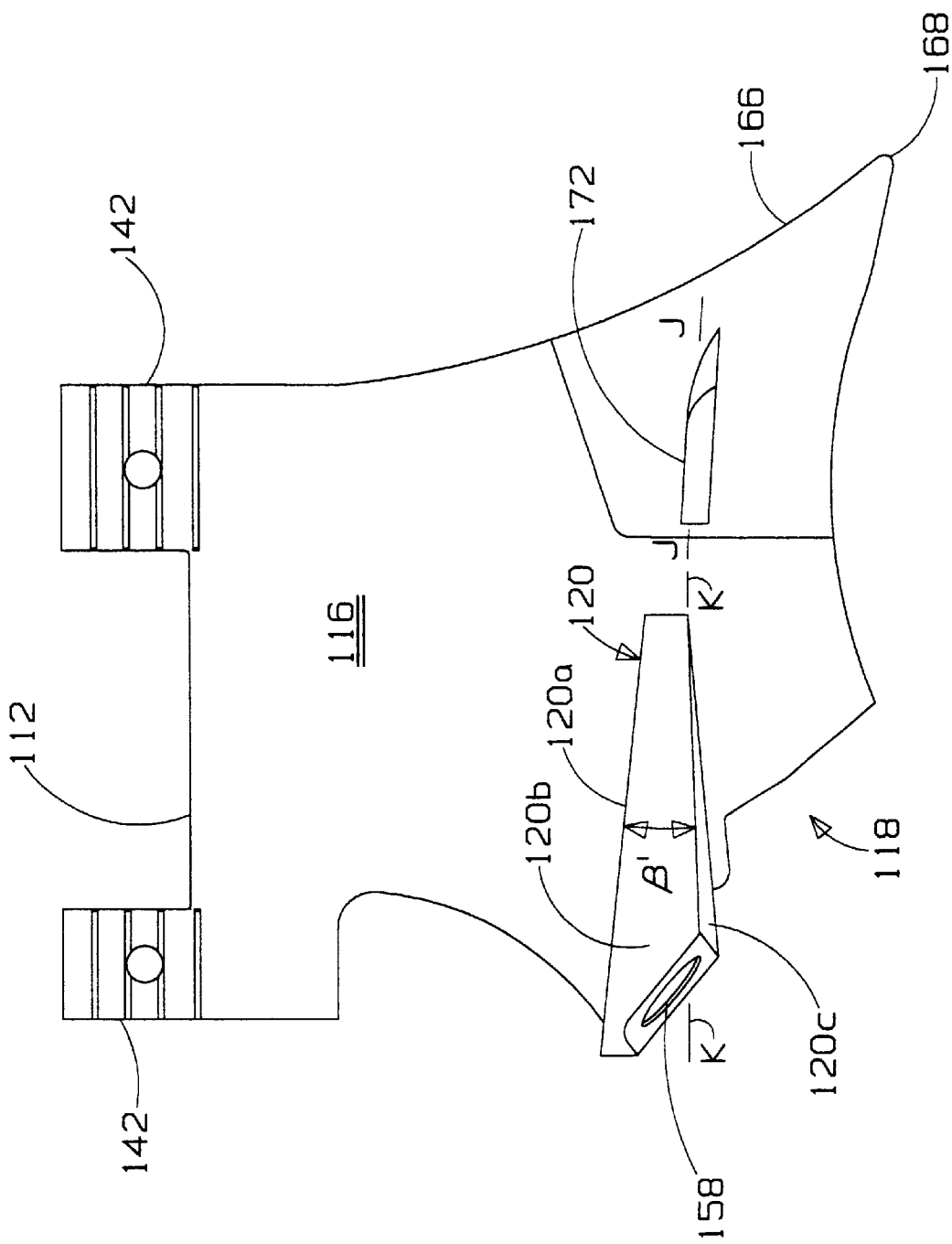
FIG. 10 is, in left side elevation view, the opening blade of FIG. 9.
Figure 11:
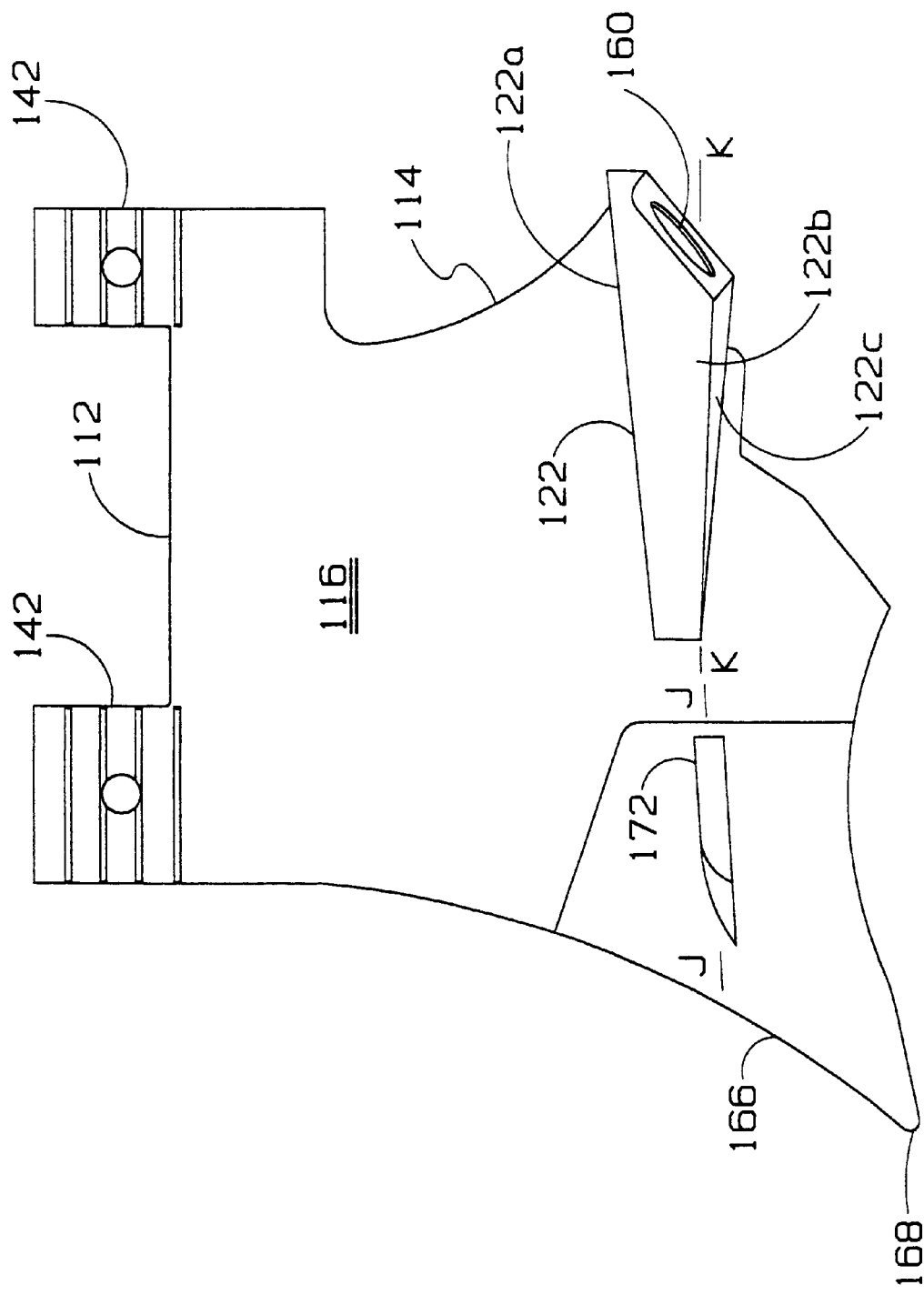
FIG. 11 is, in right side elevation view, the opening blade of FIG. 9.
Figure 12:
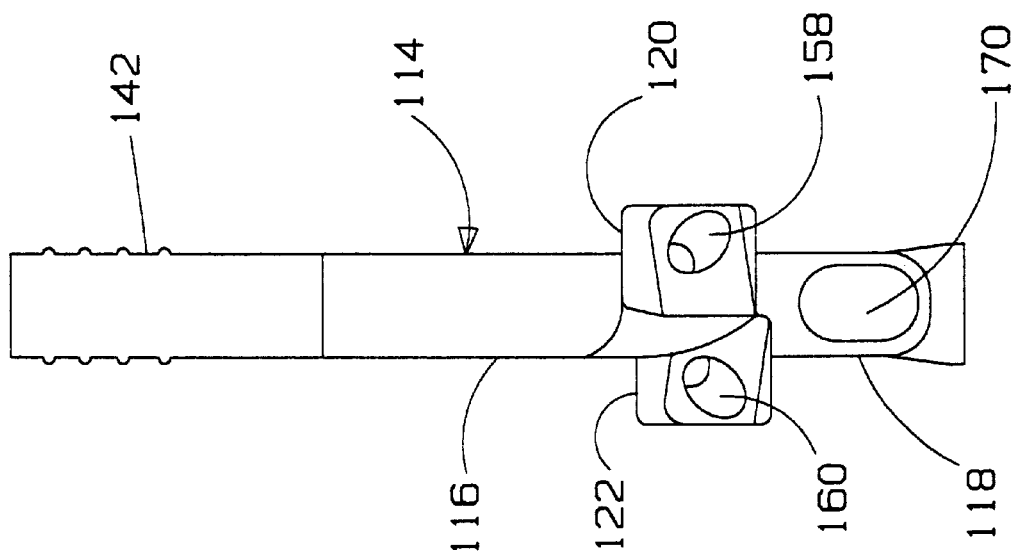
FIG. 12 is, in rear elevation view, the opening blade of FIG. 9.
Figure 13:
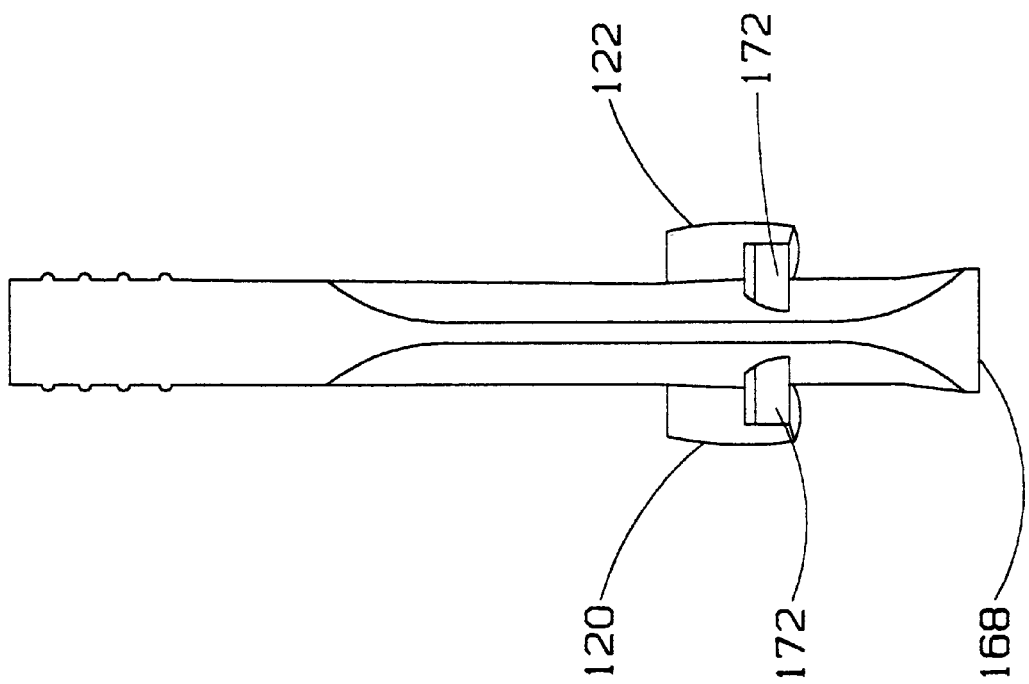
FIG. 13 is, in front elevation view, the opening blade of FIG. 9.
Figure 14:
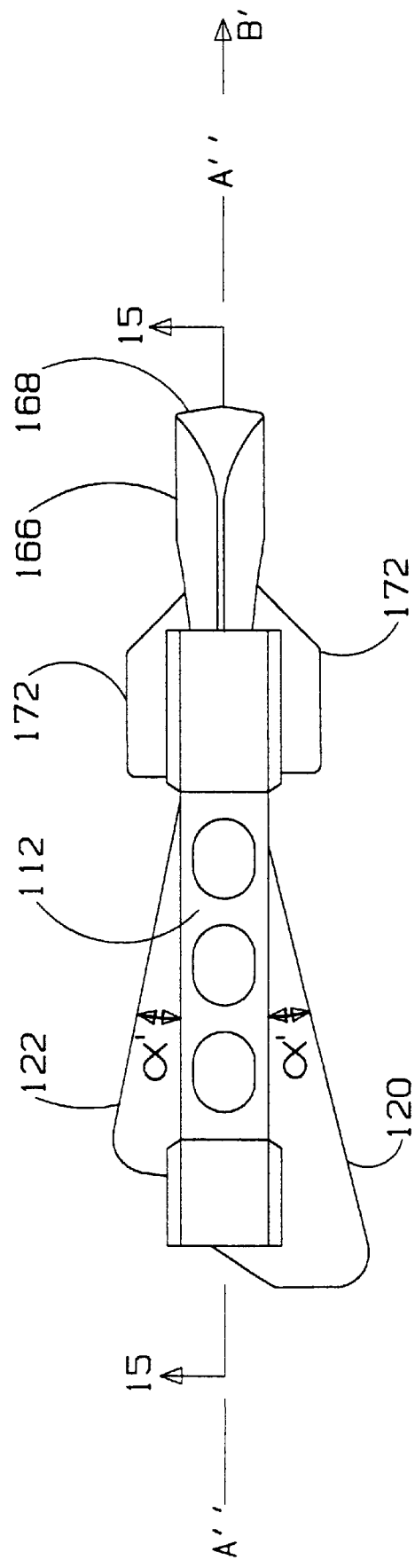
FIG. 14 is, in plan view, the opening blade of FIG. 9.
Figure 15:
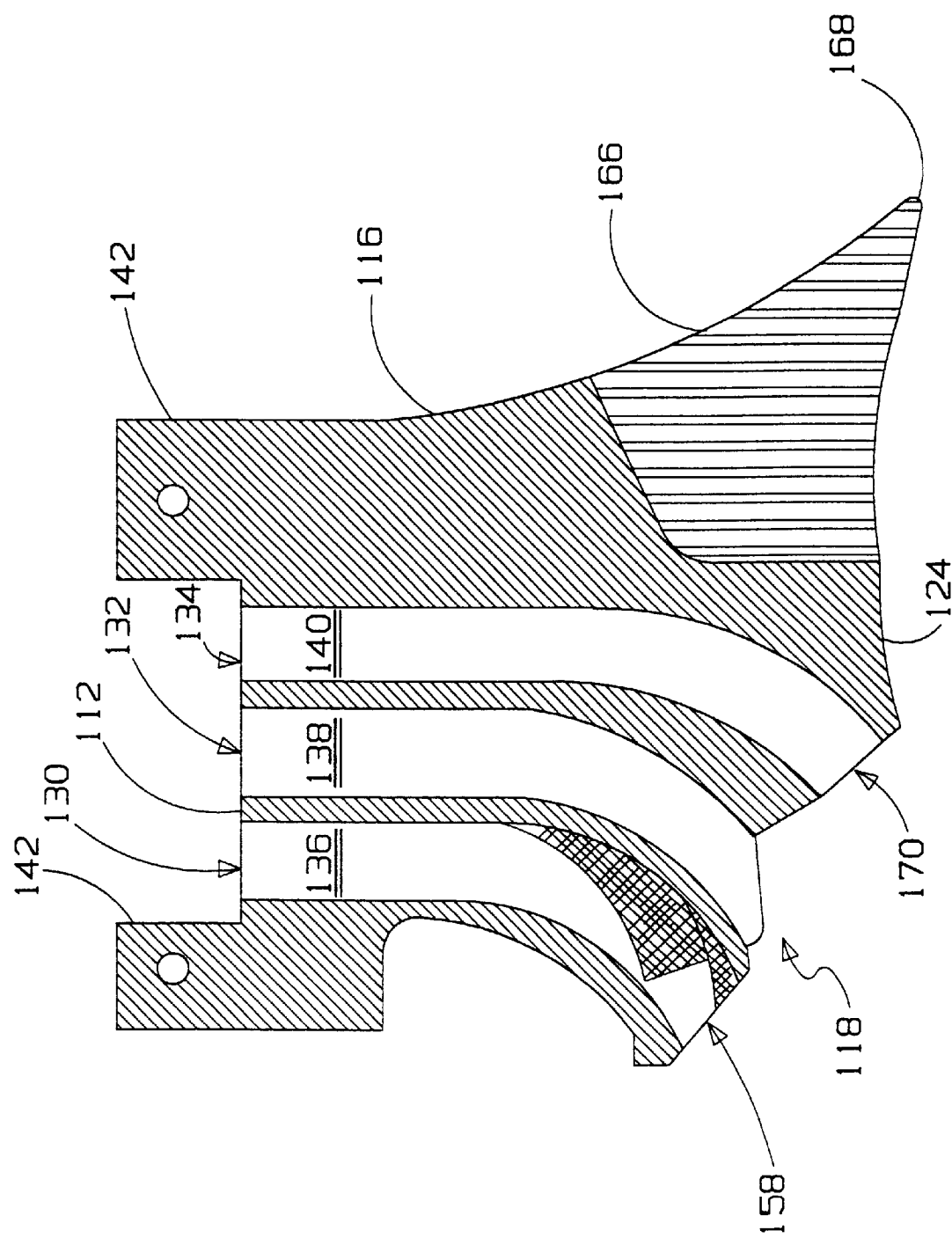
FIG. 15 is a cross-sectional view along line 15–15 in FIG. 14.
Figure 16:
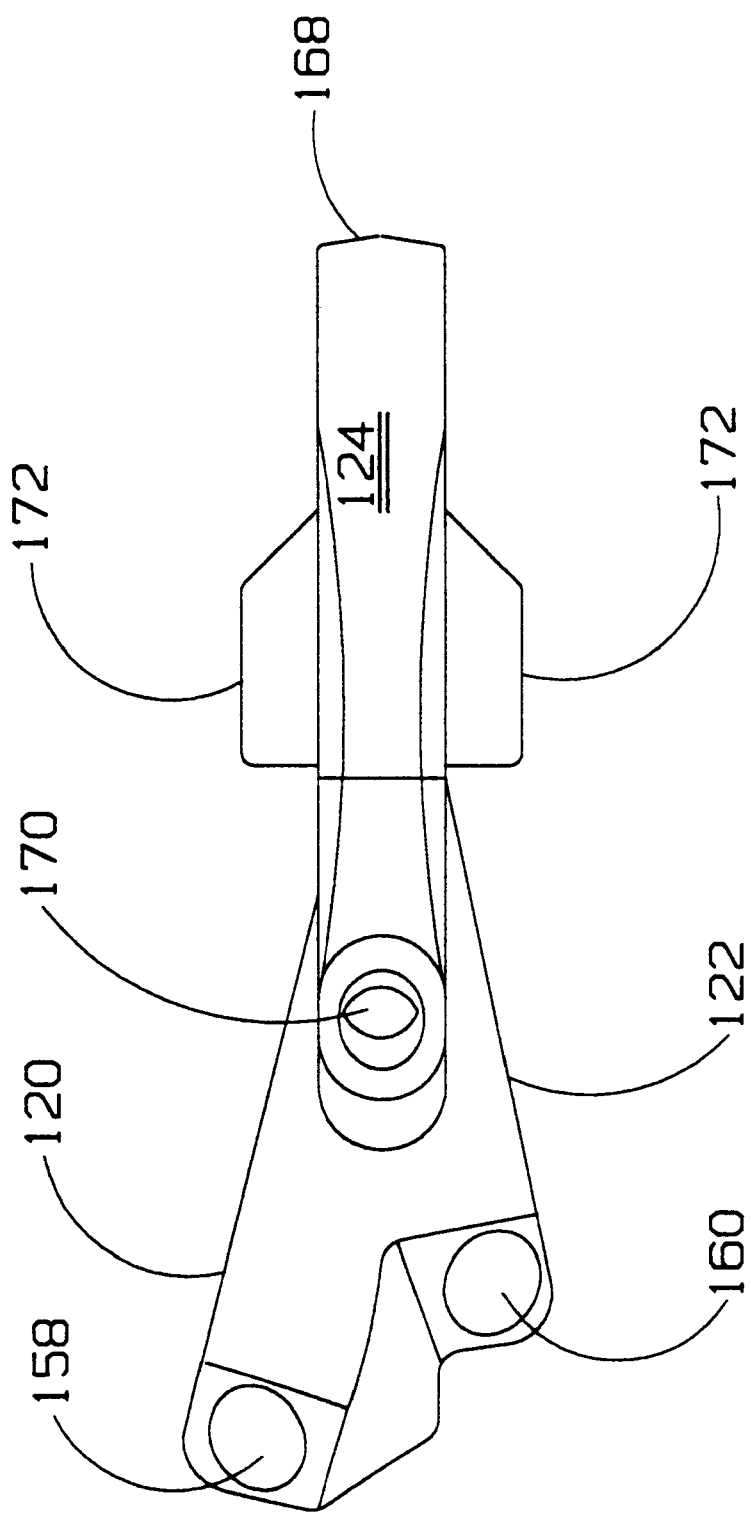
FIG. 16 is, in bottom view, the opening blade of FIG. 9.

It has been found that the passing of wings 20 and 22 and the passing of foot 18 in their form as described herein, causes a fluid-like circulation in direction D of soil 78 aft of wings 20 and 22. It is understood that the view of FIG. 7 is an approximation of the cross-section through the soil immediately behind blade 14 as it is translating through the soil. The soil, acting in a fluid manner, collapses so as to drop down shoulders 84 as the soil beneath shelves 82 is circulated in counter-rotation in direction D. Applicant has found that this circulation transports seeds 88 laterally outwardly along shelves 82 so as to facilitate advantageous lateral spacing apart of seeds on either side of furrow 80 separated both laterally and vertically from fertilizer 86 so as to inhibit chemical burning of the seeds for example by reason of the spacial relationship approximated by the illustration of FIG. 8.

It is understood that the order and type of materials introduced into ports 30, 32 and 34 may be changed as would be known to one skilled in the art so as to introduce, for example, seeds through ports 30 and 32 and water through port 34. A person skilled in the art would also understand that ports 30, 32 and 34 would have to be attached by appropriate conduits to corresponding hoppers or reservoirs.

Figure 2:
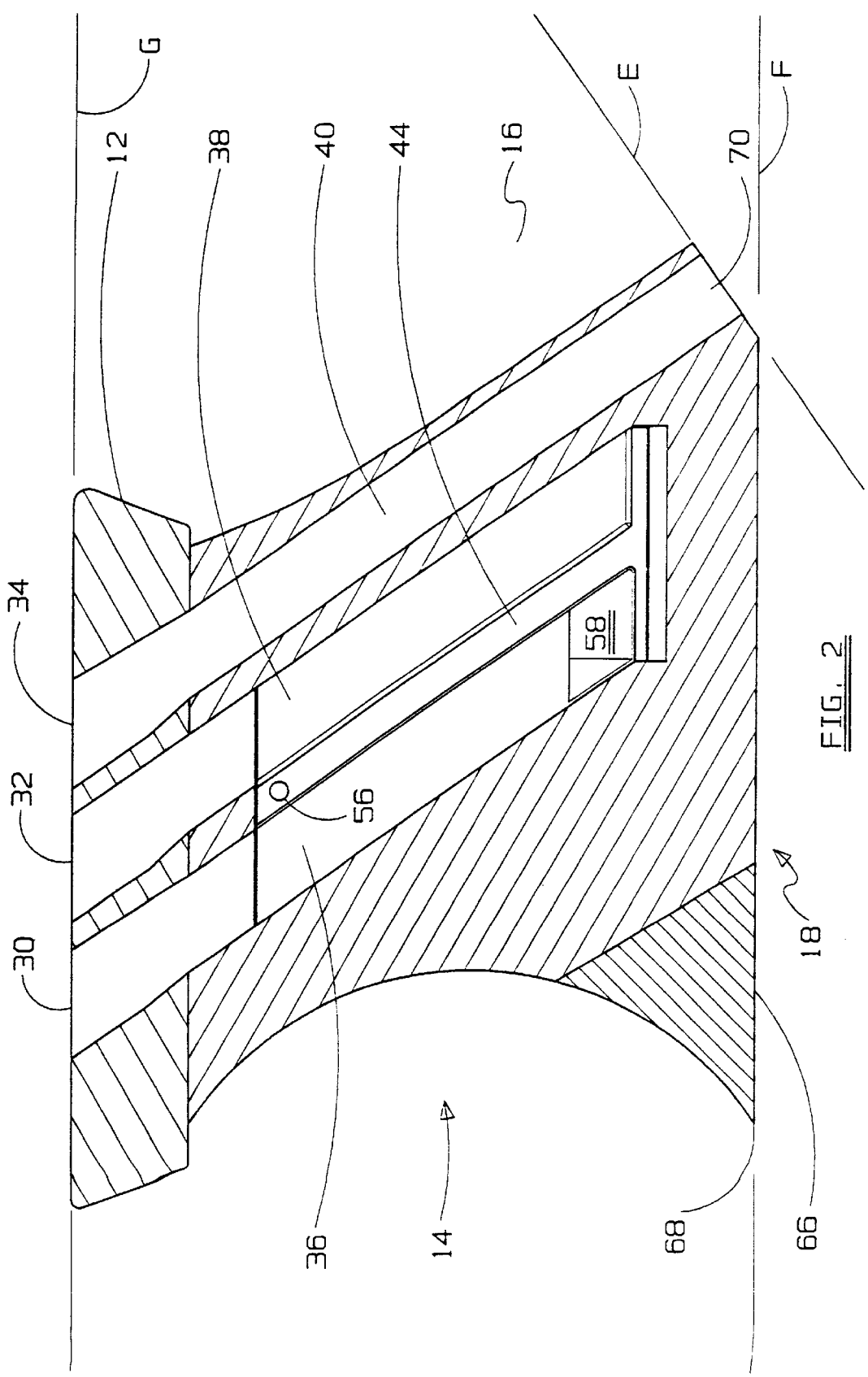
FIG. 2 is a cross-sectional view along line 2—2 in FIG. 1.

In one embodiment, although not intended to be limiting, certain planes assist in defining the relationship of the elements of the present invention relative to one another as described above and claimed hereinbelow. Firstly, blade structure 14 is generally bisected by a first plane A, referred to above as coinciding with the plane of symmetry of trunk 16, which contains both the axis A' and the cross-sectional view reference line 2—2 seen in FIG. 1. The cross-sectional view of FIG. 2 is a view through a cutaway along first plane A. A second plane E is the plane containing the edges of aperture 70 at the lowermost end of channel 40. A third plane F is the plane containing foot lower surface 24. A fourth plane G is the plane containing the upper surface of mounting block 12. Lastly, a wing bisecting plane H bisects wing 20 by bisecting angle beta and a corresponding parallel wing bisecting plane bisects wing 22 by bisecting the corresponding angle on wing 22.

As may be seen in FIGS. 9–15, another embodiment of the no-tillage in-line sub-surface seeding, fertilizing and watering device of the present invention is depicted as opening blade 110. Opening blade 110 has an upper, ported surface 112 rigidly mounted atop a generally planar blade structure 114. Blade structure 114 has a trunk 116 depending generally vertically beneath surface 112. Formed as part of the lower end of trunk 116 is a foot structure generally indicated by numeral 118.

Upper surface 112 and blade 114, including trunk 116 and foot 118, are elongate in a generally vertical plane A". Plane A" includes the longitudinal axis of opening blade 110. With the exception of wings 120 and 122, as better described below, the outer surface of trunk 116 smoothly merges into, so as to truncate in cross-section as, lower surface 124. The plane of symmetry of trunk 116 coincides with plane A".

Upper surface 112 has ports 130, 132 and 134 formed therein. The ports cooperatively align with corresponding channels 136, 138 and 140 extending downwardly in generally parallel spaced apart array through trunk 116. Channel 140 also extends downwardly through foot 118.

Channels 136 and 138 from a pair of chutes in cooperative alignment between ports 130 and 132 and corresponding lower outlet ports 158 and 160. Lower outlet ports 158 and 160 are directed generally laterally oppositely and open from within respective wings 120 and 122.

Toe 166, which may be of a different and hardened material relative to the material forming foot 118, is rigidly mounted, by bolting or other means known in the art, to the forward portion of foot 118 so as to form a forwardly extending point or snout 168, forwardly facing in the direction of forward translation B" when the blade is translated in use. Mounting ears or blocks 142 mounted or formed on surface 112, trunk 16 and foot 18 may be made of austempered ductile iron (hereinafter ADE) and toe 166 may be made of a chrome alloy. Wings 120 and 122 may also be made of ADI. Ears or blocks 142 may provide for vertically adjusting the position of blade 110 to compensate for disc wear.

Channel 140 forms a continuous conduit between port 134 and rear aperture 170. The rear-most end of lower surface 24 may be upturned for example so as to provide aperture 170 with an opening generally perpendicular to the adjacent longitudinal axis of channel 140. Channels 136, 138 and 140 may be generally parallel and may be raked aft in a downward direction between inlet ports 130, 132 and 134 and outlet ports 158, 160 and 170. Outlet port 170 may, for example, be displaced downwardly 1½ inches from ports 158 and 160, and ports 158 and 160 may be level with each other.

Wings 120 and 122 may each be shaped as truncated wedges or otherwise as what may be described as irregular pyramid shapes wherein the vertex of each wedge or pyramid is aligned so as to be forward facing (in direction B') with the wedge diverging aft. Channels 136 and 138 open aft through the base of the wedges. In one embodiment and without intending to be limiting, the acute angles alpha α'and β', formed at the vertex of the wedges forming wings 120 and 122 may be approximately 5 degrees and approximately 15 degrees respectively. Upper surfaces 120a and 122a, lateral surfaces 120b and 122b, and lower surfaces 120c and 122c of wings 120 and 122 respectively may each be generally planar. Upper surfaces 120a and 122a may extend aft and outwardly over the aft apertures 158 and 160 respectively which may be inclined downwardly.

A pair of oppositely disposed canards 172 may be rigidly mounted to foot 118, for example onto toe 166 so as to project cantilevered laterally outwardly of the side surfaces of the foot or toe canards 172 generally lie in a plane J, and may be aligned so as to extend longitudinally in a direction generally parallel to, or so as to intersect, a plane such as plane K containing either wings 120 or 122. Although not wishing to be bound to any one particular theory of physical or fluid mechanics, in applicant's view, during operation, canards 172 serve to agitate the sub-surface soil through which opening blade 110 is passing in direction B', without adding to soil surface disturbance, thereby lessening erosion of at least the foot and wings, reducing the amount of power required to translate the blade through the soil and possibly lessening turbulence in the fluid flow of the soil about the blade.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A sub-surface seeding, fertilizing and watering device comprising:

an opening blade, said opening blade having first and second sides extending between a leading edge and an aft edge, said first and second sides generally symmetrical to each other on either side of a first plane, said first plane generally bisecting said opening blade, said leading edge and said aft edge lying generally in said first plane, said opening blade mountable to a material feeder so as to be generally vertically disposed when mounted thereon for partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending from, and cooperating with, at uppermost ends thereof, first and second infeed ports in said upper surface, said first and second conduits cooperating with, at lowermost ends thereof, said first and second aft opening wing apertures, said first and second conduits thereby in material flow communication between said first and second infeed ports and corresponding said first and second aft opening wing apertures for seed, fertilizer or fluid flow, as fed from said material feeder, therethrough during said forward translation, a pair of oppositely disposed rigid canards for sub-surface soil agitation mounted to said first and second sides, so as to extend cantilevered outwardly therefrom, between said leading edge and said first and second forward wing edges, said pair of oppositely disposed rigid canards mounted to said first and second sides at, respectively, third and fourth distances from said lower surface measured generally parallel to said first plane, wherein said first, second, third and fourth distances are less than said first submerged depth so that said first and second wings and said pair of oppositely disposed rigid canards are submerged in the soil during said forward translation.

2. The device of claim 1 wherein said opening blade further comprises a third conduit extending in material flow communication between a third infeed port in said upper surface and an aft opening blade aperture in a rearward position on said opening blade in proximity to said aft edge for seed, fertilizer or fluid flow, as fed from said material feeder, therethrough during said forward translation.

3. The device of claim 2 wherein said aft-opening blade aperture is centrally disposed relative to said first plane so as to lie generally symmetrically across said first plane.

4. The device of claim 3 wherein said aft-opening blade aperture intersects said lower surface.

5. The device of claim 4 wherein said aft-opening blade aperture is closer to a lower-most end of said leading edge than said aft opening wing apertures.

6. The device of claim 5 wherein said aft-opening blade aperture lies in a second plane at generally 30° inclined relative to a third plane generally containing said lower surface, wherein said third plane is generally orthogonal to said first plane.

7. The device of claim 2 wherein said first, second and third conduits are generally parallel and raked aft of corresponding said first, second and third infeed ports.

8. The device of claim 7 wherein said first, second and third conduits are raked aft at least in part at an angle of approximately 55° relative to a fourth plane generally containing said upper surface.

9. The device of claim 1 wherein said leading edge is concavely curved and forms a toe at an intersection of said leading edge and said lower surface.

10. The device of claim 9 wherein said toe is pointed and made of hardened material relative to the hardness of material forming the balance of said opening blade.

11. The device of claim 1 wherein said first and second wings and said pair of oppositely disposed rigid canards are generally wedge-shaped and said forward wing edges and forward edges of said pair of oppositely disposed rigid canards are vertices of said wedge-shapes.

12. The device of claim 11 wherein said first wing is set back a first longitudinal distance from said leading edge and said second wing is set back a second longitudinal distance from said leading edge, and wherein said first longitudinal distance is greater than said second longitudinal distance.

13. The device of claim 12 wherein an upper wing surface on said first and second wings extends aft over corresponding said first and second aft-opening wing apertures.

14. The device of claim 13 wherein a lower wing surface on said first and second wings forms a first wedge angle of approximately 5° with said upper wing surface.

15. The device of claim 14 wherein laterally outer-most wing surfaces extend between said upper and lower wing surfaces on said first and second wings, and wherein said outer-most wing surfaces intersect corresponding said first and second sides at corresponding said first and second forward wing edges.

* * * * *